United States Patent Office 3,755,420
Patented Aug. 28, 1973

3,755,420
TRIGLYCIDYL ETHER OF TRIHYDROXY BIS-PHENYL ESTER OF ACRYLIC ACID
Donald G. Stoffey, and Henry L. Lee, Jr., San Marino, Calif., assignors to Lee Pharmaceuticals, South El Monte, Calif.
No Drawing. Original application Dec. 28, 1970, Ser. No. 102,044. Divided and this application July 14, 1972, Ser. No. 271,763
Int. Cl. C07c 69/54
U.S. Cl. 260—486 R    4 Claims

ABSTRACT OF THE DISCLOSURE

Bisphenol-A-bis(2,3 - dimethacrylatopropyl ether) and the adduct of methacrylic acid and triglycidyl ether of trihydroxy biphenyl are utilized as binders for dental restorative compositions.

This application is a divisional of application Ser. No. 102,044, filed Dec. 28, 1970, now U.S. Pat. 3,721,644.

BACKGROUND OF THE INVENTION

Field of the invention

This invention is related to certain aromatic, thermosetting acrylic resins and their use as binders in dental filling compositions for the direct filling of teeth.

DESCRIPTION OF THE PRIOR ART

Thermosetting acrylic esters of bisphenolic compounds have been used in the past for a variety of purposes, including, for example, the potting of electrical coils. Many such compounds are disclosed in U.S. Pat. 2,890,202.

Certain specific acrylic resins have been used as binders for dental restorative purposes. In particular, the compounds disclosed in Bowen in U.S. Pat. 3,066,112 and 3,179,623 have been used with some success.

Chief among the resins of Bowen is a compound having the formula:

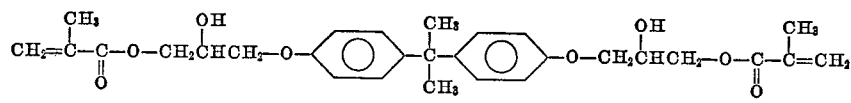

which is glycidyl methacrylate derivative of bisphenol-A and which is sometimes referred to as BIS-GMA. This compound has also been referred to as bisphenol-A-bis(3-methacrylato-2-hydroxypropyl)ether.

While the general properties of BIS-GMA are quite good for dental restorative purposes, this resin is extremely viscous and sometimes tends to absorb undesirable amounts of water when used in wet environments, and has a gel time longer than that which is desirable for many purposes.

SUMMARY OF THE INVENTION

The principal object of the present invention is to provide thermosetting resins useful in molding compositions and which are particularly useful in dental restorative compositions, which have improved handling characteristics and higher crosslinked densities when compared to BIS-GMA, but still possess all of the favorable characteristics of BIS-GMA. It has been discovered that significantly improved thermosetting resins which are useful as binders in dental restorative compositions are obtained from monomer compounds of the following formulae:

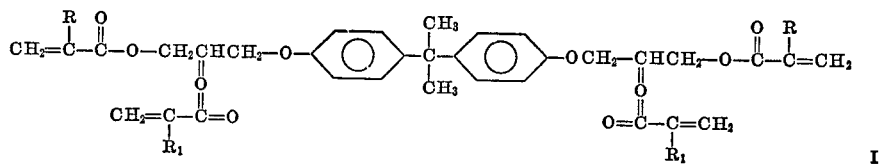

wherein each of R and $R_1$ may independently be hydrogen, lower alkyl, i.e., straight or branched chain alkyl of 1 to 4 carbon atoms, methyl being preferred, or halogen, chlorine being preferred; and

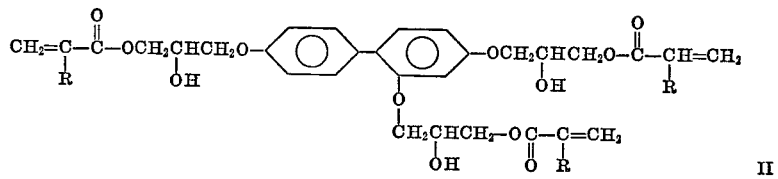

wherein R is a hydrogen, lower alkyl, i.e., straight or branched chain alkyl of 1 to 4 carbon atoms, preferably methyl, or halogen, chlorine being preferred. The preferred meaning of R is methyl.

DESCRIPTION OF THE PREFERRED EMBODIMENTS

As indicated above, in accordance with the present invention, dental restorative compositions having improved handling characteristics, higher crosslinked densities and other favorable characteristics are obtained when a monomeric polyacrylic resin of the present invention is used as the predominant binder component.

The general classes of such monomeric resins have been defined in the above formulae. Two monomer compounds falling within the scope of the foregoing formulae are particularly preferred. First is a compound of the formula:

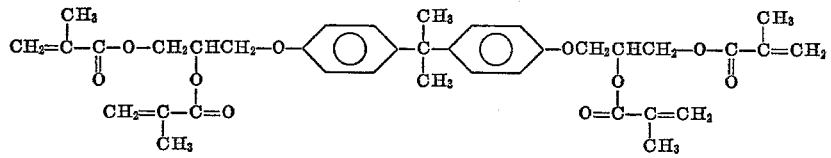

which may be named bisphenol-A-bis(2,3-dimethacrylatopropyl ether); and the second is a compound of the formula:

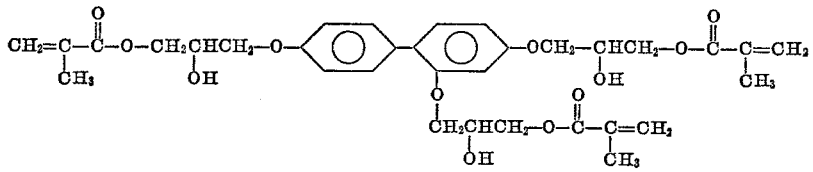

The foregoing monomers yield thermosetting polymers of increased crosslinked density over those previously utilized by the prior art. The resins of the present invention have a much faster gel time than the prior art materials and a generally lower degree of swelling in the polymerized material results. An additional advantage of the compounds of Formula I is that the absence of hydroxyl groups lessens the amount of water which can be absorbed by the material.

The acrylates of Formula I of this invention may be prepared by reacting BIS-GMA with an excess of an acryl chloride in the presence of a tertiary amine such as triethylamine or pyridine.

The compounds of Formula II of this invention may be prepared by reacting the triglycidyl ether of trihydroxy biphenyl with methacrylic acid in the presence of a catalyst such as a tertiary amine, triphenylphosphine, or triphenylantimony. The former is commercially available as Kopox-171. While Kopox-171 may be used in its commercially available form, it contains a significant percentage of high molecular weight material and undistillable colored matter, the presence of which tends to impart undesirable color to the desired acrylate product. It is preferable that the Kopox-171 be molecularly distilled to yield substantially pure triglycidyl ether of trihydroxy biphenyl.

The following examples describing certain specific embodiments of the invention will serve to further illustrate the nature of the invention.

Example 1

110 ml. of freshly distilled methacryl chloride is added dropwise to a solution of 260 g. of bisphenol-A-bis(3-methacrylate - 2 - hydroxypropyl)ether, 440 ml. of dry methylene chloride and 170 ml. of triethylamine. During the addition, the reaction mixture is kept at a temperature between 10 and 15° C. Following completion of the addition, the temperature of the solution is allowed to warm to room temperature during continuous stirring and maintained at that temperature for approximately 30 minutes. Thereafter, the amine salt formed is filtered off, and the remaining cake washed with methylene chloride. The combined organic layer is washed with 0.1 normal hydrochloric acid until acidic, and then with water until neutral. After a final wash with water, it is dried over anhydrous sodium sulfate and the solvent removed by evaporation on a rotary evaporator at 2 mm./Hg pressure. The residue is a colorless liquid of significantly less viscosity than BIS-GMA.

Example 2

35.5 g. of the triglycidyl ether of trihydroxy biphenyl (obtained by the molecular distillation of Kopox-171), 24 g. of methacrylic acid and 0.6 ml. of triethylamine are heated for one day at 45° C., one day at 55° C., one day at 65° C., and an additional day at 80° C. The product, the compound of Formula II above, is an amber, viscous liquid.

The product obtained according to Example 1 above exhibits a significantly lower viscosity than BIS-GMA. This compound and the compound of Example 2 can be formulated into dental restorative filler compositions without the use of any viscosity reducing diluents. It is especially significant to note that the compound of Example 1 has significantly less water absorption tendencies than BIS-GMA.

As indicated, the monomeric polyacrylic resins of this invention are utilized as binders in dental restorative compositions. Typically, such compositions consist of approximately 65 to 75% by weight of finely divided solid particles of a filler and about 25 to 35% by weight of a resin binder.

The filler may be any finely divided solid which when dispersed through the binder system will give improved structural strength when the binder system is polymerized into a cured resin. The finely divided filler may have a particle size generally in the range of about 1 micron to about 150 microns. The preferred range is from about 1 micron to 30 microns. The best results are obtained where the inorganic filler is treated with a keying agent to improve the bond between the organic polymer binder and the surfaces of the finely divided filler particles. Keying agents which have been found highly suitable are the ethylenically unsaturated organosilane finishing or keying agents where the filler is fused silica, glass, aluminum oxide, or crystalline quartz and the binder system is of the type described. The finely divided filler may be treated with the keying agent, for example, in the manner described in U.S. Pat. 3,066,112 wherein an aqueous solution of tris(2-methoxyethoxy) vinyl silane is catalyzed with sodium hydroxide to give a pH of 9.3 to 9.8, and the filler treated with this solution, for example, one-half percent of the silane being used per weight of fused quartz. A slurry so formed is dried at about 125° C. and cooled.

Although aluminum oxide in the form of fused alumina, having a particle size of 10 microns to 50 microns, gives excellent compressive strength, it may not be desirable to use the same in preparing anterior dental fillings, as dental fillings using aluminum oxide, due to its extreme hardness and abrasive characteristics, can pick up marks from a metal utensil when rubbed against the same thus making such dental fillings, from the standpoint of appearance, possibly undesirable when such markings might become visible to a casual observer. However, because of the excellent wear resistance of fillings obtained using fused alumina, such fillings are highly suitable for filling teeth where any marking, through the contact with utensils, is less likely to occur, and if it should occur would not be visibly apparent to the casual observer.

Where more translucent filling materials are desired, as for the filling of anterior teeth, glass beads, or a mixture of glass beads and quartz may be used.

The resins produced in accordance with Examples 1 and 2 are ready for use without dilution or treatment with a reactive diluent as has been necessary previously. About 0.5 to 1 percent by weight based on the weight of binder, or more, or an activator, such as, for example, dimethyl-para-toluidine, may be added to the resin. A suitable catalyst, such as, for example, 1 percent by weight benzoyl peroxide, based on the weight of binder, may be mixed into the treated filler material. The filler material containing the catalyst and the resin containing the activator may then be thoroughly mixed together and promptly placed in a cavity to be filled. The binder will polymerize at mouth temperature to harden the filling within about ten minutes.

Other suitable activators include, inter alia, para-toluene sulfinic acid, para-tolyl diethanol amine and other tertiary amines which are well known in the art. The amount of activator to be used depends on the particular compound utilized and on the working time desired. Generally the activator will be present in amounts of less than 1 percent by weight of the monomers in the binder.

While benzoyl peroxide is a preferred catalyst, other peroxide, 0.1% N,N-dimethyl-(p-toluidine). This resin art. The catalyst should preferably be present in an amount ranging from 1 percent to 2 percent by weight based on the weight of the monomers present in the binder.

The solid fillings formed from the compositions of this invention have high compressive strengths which are well within the standards as set forth in American Dental Association Specification No. 9.

By way of illustration, the monomer compound of Example 1 is mixed with one percent by weight of benzoyl peroxide, 0.1% N,N-dimethyl-(p-toluidine). This resin mixture is then blended with a silica filler which has been silane treated in the manner described above in the proportion of 30% resin and 70% filler by weight. The resulting composition is placed in the prepared cavity of a tooth, a satisfactory gel forming in approximately 2½ to 3 minutes. The compressive strength of the filling was 30,000 p.s.i. after 15 minutes, 31,400 p.s.i. after 30 minutes, and 34,700 p.s.i. after 1 hour according to American Dental Association Specification No. 9.

Also, the solubility and disintegration characteristics of the solid fillings, as judged by the same specification, are very low. All other characteristics of the compositions of this invention indicate a high utility as a dental restorative material.

We claim:
1. A compound of the formula:

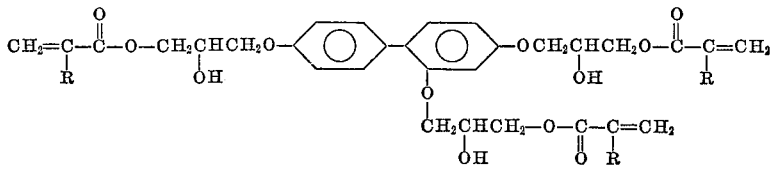

wherein R is hydrogen, lower alkyl, or halogen.
2. A compound as claimed in claim 1 wherein R is hydrogen.
3. A compound as claimed in claim 1 wherein R is lower alkyl.
4. A compound as claimed in claim 1 wherein R is methyl.

References Cited
UNITED STATES PATENTS
3,679,447   7/1972   Aronoff et al. _____ 106—287

FOREIGN PATENTS
657,894   2/1963   Canada _____ 260—486 R

LORRAINE A. WEINBERGER, Primary Examiner

P. J. KILLOS, Assistant Examiner

UNITED STATES PATENT AND TRADEMARK OFFICE
CERTIFICATE OF CORRECTION

PATENT NO. : 3,755,420
DATED : August 28, 1973
INVENTOR(S) : Donald G. Stoffey and Henry L. Lee, Jr.

It is certified that error appears in the above-identified patent and that said Letters Patent are hereby corrected as shown below:

Column 2, formula I, those portions of the formula reading

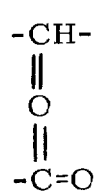  should read  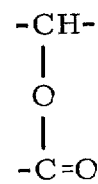

Signed and Sealed this twenty-sixth Day of August 1975

[SEAL]

Attest:

RUTH C. MASON
*Attesting Officer*

C. MARSHALL DANN
*Commissioner of Patents and Trademarks*